United States Patent [19]

Ito et al.

[11] 3,869,141
[45] Mar. 4, 1975

[54] VEHICLE SUSPENSION SYSTEM
[75] Inventors: Naganori Ito; Hiroshi Aikawa, both of Tokyo, Japan
[73] Assignee: Nissan Motor Company, Limited, Yokohama, Japan
[22] Filed: Mar. 20, 1973
[21] Appl. No.: 343,027

[30] Foreign Application Priority Data
Mar. 27, 1972 Japan.............................. 47-29700

[52] U.S. Cl.............................. 280/124 F, 267/65 D
[51] Int. Cl............................................ B60g 17/04
[58] Field of Search................... 280/124 F, 124 R; 267/65 R, 65 D, 122, 123

[56] References Cited
UNITED STATES PATENTS

| | | | |
|---|---|---|---|
| 2,895,744 | 7/1959 | Jackson........................... | 280/124 F |
| 3,035,851 | 5/1962 | Capgras......................... | 280/124 F |
| 3,203,708 | 8/1965 | Chaneac et al................ | 280/124 F |
| 3,581,671 | 6/1971 | Hart.................................. | 280/124 R |
| 3,736,000 | 5/1973 | Capgras......................... | 280/124 F |

Primary Examiner—David Schonberg
Assistant Examiner—John A. Carroll

[57] ABSTRACT

A vehicle suspension system in which the actual available volume of a gas chamber assembly for each suspension strut is decreased during high-speed turn, acceleration or braking to increase resistance to rolling and pitching. The gas chamber of a hydropneumatic spring is connected with an auxiliary gas chamber through a spool valve, the spool of which is axially movable under the action of a horizontal force exerted on a weight operatively connected thereto. When the vehicle is subjected to a horizontal component of force, the spool is moved to a position to block communication between the gas chamber of the hydropneumatic spring and the auxiliary gas chamber to thereby reduce the actual available volume of the gas chamber assembly. In another embodiment, the spool valve also functions to isolate a fluid chamber of each strut from a pump and a reservoir during the certain drive conditions as mentioned above, thereby preventing deterioration of driveability.

12 Claims, 5 Drawing Figures

VEHICLE SUSPENSION SYSTEM

This invention relates to vehicle suspension systems of the kind in which a source of fluid under pressure communicates with a pair of suspension struts the effective suspension lengths of which are automatically controlled independently of the load of the vehicle. The pair of suspension struts may be associated with the front and rear wheels or right and left wheels of the vehicle.

As is well known in the art, the vehicle suspension system may function to prevent the vehicle from excessively tilting in a transverse direction during curvilinear travel or in a longitudinal direction during acceleration or braking. However, since each suspension strut is arranged to dampen relative axial movements of the cylinder and the piston with a suitable time lag so as to obtain a smooth action of the strut even on a rough surface, then, if the vehicle is travelling in a meandering fashion at high speeds, the time lag induces an undesired deterioration of driveability, which leads to the danger of the driver loosing control of the vehicle.

It is therefore an object of the present invention to provide an improved vehicle suspension system with a view to overcoming the above-stated disadvantage.

Another object of the present invention is to provide an improved vehicle suspension system in which the actual volume of a gas chamber of each suspension strut is decreased during certain drive conditions as high-speed turn, acceleration or braking to increase resistance to rolling or pitching so as to provide a satisfactorily smooth ride.

It is a further object of the present invention to provide an improved vehicle suspension system in which the fluid chamber of each suspension strut is isolated from the fluid pump and reservoir during the above-mentioned drive conditions so as to prevent deterioration of driveability.

These and other features will be readily apparent from the following detail description of embodiments of the invention when read in conjunction with the accompanying drawings, in which.

Figure 1:
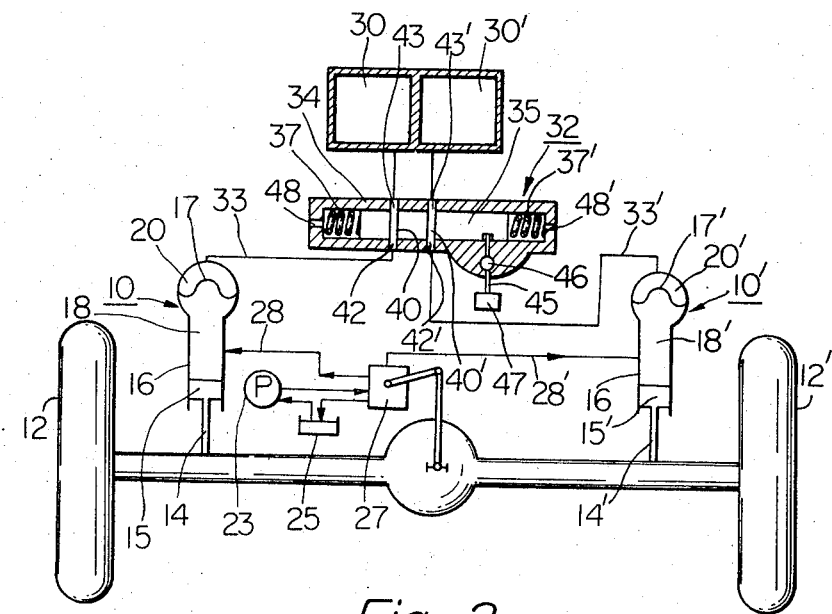
FIG. 1 is a schematic diagram showing an embodiment of a vehicle suspension system of the invention.

Referring now to FIG. 1, the suspension system as depicted includes two suspension struts 10 and 10' of the conventional construction which are associated with either the front or rear right and left wheels 12 and 12' of the vehicle, respectively. The suspension struts 10 and 10' comprise shock absorbers including piston rods 14 and 14' which carry pistons 15 and 15' working in cylinders 16 and 16' and subjected on their upper surfaces to hydraulic fluid, hereinafter referred to as fluid, under pressure, and diaphragm members 17 and 17' by which hydropneumatic spring means (no numerals) connected to the interiors of the cylinders 16 and 16' are divided into fluid chambers 18 and 18' and gas chambers 20 and 20'. A pump 23 is provided for supplying the system with hydraulic fluid under pressure and may be driven by the engine of the vehicle or any other convenient means such as an electric motor. The pump 23 is fed with hydraulic fluid from a reservoir 25 and pumps hydraulic fluid to the fluid chamber 18 and 18' of the suspension struts 10 and 10' through a prior art levelling valve 27 and pipe lines 28 and 28', through which excess fluid also is drained. The function of the levelling valve 27 is to control the direction of flow of hydraulic fluid therethrough, so as to maintain the effective lengths of the struts constant thereby maintaining a predetermined vehicle level.

In the suspension system shown in FIG. 1, the gas chambers 20 and 20' of the struts are constructed to be of considerably smaller volume than in conventional arrangements, and auxiliary gas chambers 30 and 30' are provided for cooperation with the gas chambers 20 and 20'. The gas chamber 20 communicates with the auxiliary gas chamber 30 through a spool valve 32 and a pipe line 33, and the gas chamber 20' communicates with the auxiliary gas chamber 30' through the spool valve 32 and a pipe line 33'.

The spool valve 32 includes a horizontally disposed cylinder 34, an axially movable spool 35 within the cylinder, and two spring members 37 and 37' for urging the spool in the opposite directions to resiliently hold it in a neutral position as shown. The spool 35 is provided with two annular grooves 40 and 40' in axially spaced relationship through which ports 42 and 42' leading respectively to the gas chambers 20 and 20' communicate with ports 43 and 43' leading respectively to the auxiliary gas chambers 30 and 30' when the spool 35 is held in the neutral position.

The spool valve 32 further includes sensor means for sensing a horizontal component of force exerted on the body of the vehicle. In the embodiment shown, the sensor means comprises a lever 45 pivotally mounted on a pin 46 secured on the cylinder 34, and a weight 47 secured to the lower end of the lever 45. The upper end of the lever 45 is operatively connected with the spool 35 so that rotation of the lever moves the spool in the axial direction.

The cylinder 34 is formed in the end surfaces thereof with orifices 48 and 48', and the restriction of the flow of air through the orifices imposes a drag on spool movements, thus quickly dampening any spool oscillations.

With the arrangement as described above and shown in FIG. 1, when the vehicle is driven without being subjected to any horizontal component of force, the spool 35 is held in the neutral position and accordingly the auxiliary gas chambers 30 and 30' are kept in communication with their associated gas chambers 20 and 20' through the spool valve 32. It follows that the gas chambers 20, 20', 30 and 30' act to absorb road shocks. Thus, it will be appreciated that since the overall "spring constant" of the suspension struts 10 and 10' is decreased to a low value, a satisfactorily smooth ride is achieved.

When the vehicle is subjected to a large horizontal component of force as during a high-speed turn, the centrifugal force exerted on the weight 47 causes axial movement of the spool 35, blocking the communications between the ports 42 and 43 and between the ports 42' and 43'. Since, at this time, only the gas chambers 20 and 20' are operative, the overall "spring constant" of the struts 10 and 10' is increased, resulting in an increase in resistance to rolling. Thus, it will be understood that the extent of rolling of the vehicle can be considerably reduced.

Figure 2:
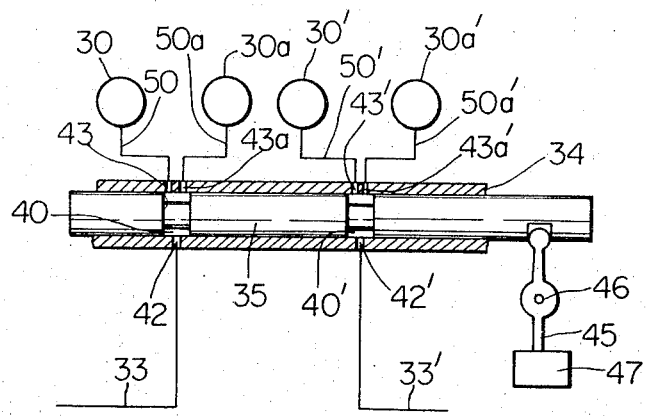
FIGS. 2, 3 and 4 show in part other embodiments of the invention.

In FIG. 2, there is shown in part another embodiment of the present invention in which two auxiliary gas chambers are provided for each suspension strut. The auxiliary gas chambers 30 and 30a communicate with axially spaced ports 43 and 43a through pipe lines 50 and 50a, respectively, and the auxiliary gas chambers 30' and 30a' communicate with axially spaced ports 43' and 43a' through pipe lines 50' and 50a', respectively. The axial dimensions of the annular grooves 40 and 40' are increased so as to provide communications to the ports 43 and 43a and simultaneously to the ports 43' and 43a' when the spool 35 is held in the neutral position. By so doing, it is possible for the main gas chamber 20 to selectively communicate with one or both of the auxiliary gas chambers 30 and 30a and also for the gas chamber 20' to communicate with one or both of the auxiliary gas chambers 30' and 30a', to thereby adjust the overall "spring constant" of each suspension strut to the drive conditions. Thus, it will be appreciated that the vehicle resistance to rolling can be regulated in a satisfactory manner.

Figure 3:
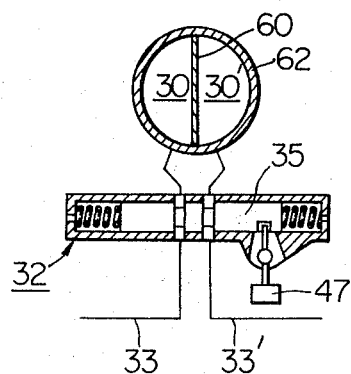
Figure 4:
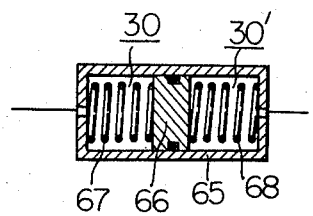

In FIG. 3, there is shown in part a further embodiment of the present invention which differs from that of FIG. 1 in that the auxiliary gas chambers 30 and 30' are defined on the respective sides of a diaphragm member 60 internally mounted in a unitary container 62. One advantage resulting from this arrangement lies in the fact that the degree of tilt of the vehicle can be minimized where one wheel passes over a hump or elevation during normal driving, since compression of the suspension strut for the one wheel will cause an increase in pressure within the associated gas chambers, which pressure is transmitted through the diaphragm member 60 to the opposite gas chambers, thereby causing the opposite suspension strut to extend. In this connection, it will be appreciated that a similar result can be achieved by providing a cylinder 65 having an axially slidable piston 66 therein which is urged in opposite directions by two coil springs 67 and 68, the auxiliary gas chambers 30 and 30' being defined on the respective sides of the piston, as is shown in FIG. 4.

Figure 5:
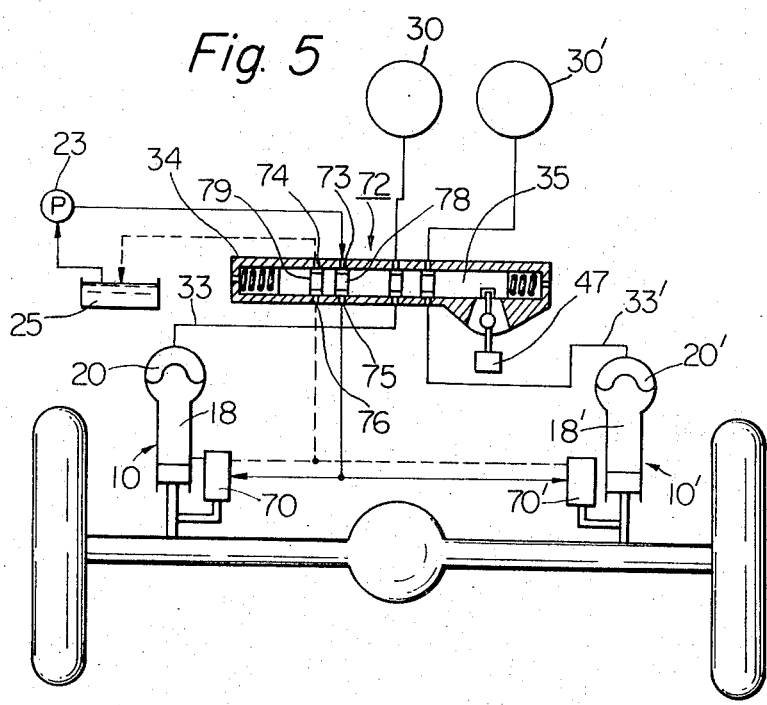
FIG. 5 is a schematic diagram of a vehicle suspension system arrangement in which a fluid chamber of a suspension unit can be isolated from a fluid pump and reservoir.

In FIG. 5, there is shown a further embodiment of the present invention wherein like reference numerals indicate like parts or components shown in FIG. 1. The suspension system includes levelling valves 70 and 70' provided for suspension struts 10 and 10'. The levelling valves 70 and 70' are responsive to relative movements of the cylinder and piston of the strut to control the flow of hydraulic fluid to and from the fluid chambers 18 and 18'. In this embodiment, the inlet of each of the levelling valves 70 and 70' communicates with the pump 23 through a spool valve 72, and the outlet thereof communicates with the reservoir 25 through the same spool valve 72. The spool valve 72 is constructed of a similar cylinder and spool as the spool valve 32 of FIG. 1, and includes a port 73 connected to the pump 23, a port 74 connected to the reservoir 25, and ports 75 and 76 connected respectively to and from the inlet ports and outlet ports of the levelling valves 70 and 70'. The ports 73 and 75 communicate through an annular groove 78 formed in the spool 35, and the ports 74 and 76 communicate through an annular groove 79 formed in the spool 35.

The operation of the suspension system of FIG. 5 is as follows: When the vehicle is subjected to a large transverse or horizontal component of force as during a high-speed turn, the spool 35 is moved in the axial direction by the centrifugal force applied on the weight 47, thereby blocking the communications between the gas chamber 20 and the auxiliary gas chamber 30 and between the gas chamber 20' and the auxiliary gas chamber 30'. Simultaneously, the spool 35 blocks the feed of hydraulic fluid from the pump 23 to the fluid chambers 18 and 18' and blocks also the discharge of hydraulic fluid from the fluid chambers 18 and 18' to the reservoir 25. Thus, it will be understood that not only is the resistance to rolling increased, but also the danger of the driver loosing control of the vehicle during a high-speed turn is eliminated because the levelling valves 70 and 70' of the suspension system are not operative.

Although description has been made with embodiments of the invention in which the two suspension struts are associated with the front or rear right and left wheels, it should be understood that the invention is equally applicable to the left or right front and rear wheel suspension struts, in which case the extent of pitching can be minimized during acceleration and braking. Furthermore, a suspension unit may preferably be provided for each wheel.

As has been described above, the present invention provides an improved vehicle suspension system characterized in that the actual volume of gas available for each suspension strut is varied to provide for increased resistance to rolling or pitching during a high-speed turn, acceleration or braking but without detriment to riding qualities during normal drive conditions. Further, it will be apparent that according to another feature of the present invention the levelling valves of the suspension system are not operating during a high-speed turn so as not to impair driveability, thus eliminating a danger of the driver loosing control of the vehicle.

What is claimed is:

1. A vehicle suspension system comprising:
   first and second suspension struts each formed of a hydraulic shock absorber and a hydropneumatic spring means provided with a gas chamber;
   levelling means comprising a fluid pump fed from a fluid reservoir to pump fluid under pressure through at least one levelling valve responsive to the vehicle level and arranged to communicate the fluid reservoir and the shock absorbers of the first and second suspension struts to automatically maintain the level of the vehicle constant independently of variation in vehicle load;
   first and second auxiliary gas chamber means;
   normally open valve means connecting the first auxiliary gas chamber means to the gas chamber of the spring means of the first suspension strut and also connecting the second auxiliary gas chamber means to the gas chamber of the spring means of the second suspension strut; and
   sensing means to sense a horizontal component of force exerted on the vehicle, the sensing means being operatively connected to the valve means so as to close the valve means and isolate the first and second auxiliary gas chamber means from the respective gas chambers of the spring means of the first and second suspension struts in response to the horizontal component of the force being sensed.

2. A system as claimed in claim 1, in which the first and second suspension struts are operatively associated with the front right and left wheels of the vehicle, respectively.

3. A system as claimed in claim 1, in which the first and second suspension struts are operatively associated with the rear right and left wheels of the vehicle, respectively.

4. A system as claimed in claim 1, in which the first and second suspension struts are operatively associated with the left front and rear wheels of the vehicle, respectively.

5. A system as claimed in claim 1, in which the first and second suspension struts are operatively associated with the right front and rear wheels of the vehicle, respectively.

6. A system as claimed in claim 1, in which the normally open valve means comprises a horizontally disposed valve cylinder; an axially movable spool within the valve cylinder; and two spring members for urging the spool in the opposite directions to resiliently hold it in a neutral position, the valve cylinder having a first port connected to the gas chamber of the spring means of the first suspension strut to communicate with a second port connected to the first auxiliary gas chamber means, a third port connected to the gas chamber of the spring means of the second suspension strut to communicate with a fourth port connected to the interior of the second auxiliary gas chamber means, the spool having first and second annular grooves providing communications between the first and second ports and between the third and fourth ports when the spool is held in the neutral position.

7. A system as claimed in claim 6, in which the sensor means comprises a weight connected to one end of a lever pivotally mounted on the valve cylinder and the other end of the lever operatively connected with the spool.

8. A system as claimed in claim 1, in which the first and second auxiliary gas chamber means each have a plurality of gas chambers therein which individually communicate with their respective gas chambers of the spring means of the first and second suspension struts through the valve means.

9. A system as claimed in claim 1, in which the first and second auxiliary gas chamber means comprise two chambers defined within a unitary container on the respective sides of a diaphragm member internally mounted therein.

10. A system as claimed in claim 1, in which the first and second auxiliary gas chamber means comprises two chambers defined within a gas cylinder on the respective sides of a piston axially movable therein, the piston being resiliently held in a neutral position by two spring members which urge the piston in the opposite directions.

11. A system as claimed in claim 6, in which the valve means is arranged to also isolate the at least one levelling valve from the fluid pump and reservoir in response to the horizontal component of force being sensed.

12. A system as claimed in claim 11, in which the valve cylinder includes a fifth port connected to the fluid pump, a sixth port connected to an inlet of the at least one levelling valve, a seventh port connected to an outlet of the at least one levelling valve and an eighth port connected to the fluid reservoir, the spool having third and fourth annular grooves formed therein, the third and fourth annular grooves providing communications between the fifth and sixth ports and between the seventh and eighth ports, respectively, when the spool is held in the neutral position.

* * * * *